United States Patent
Hotta

(10) Patent No.: US 10,724,425 B2
(45) Date of Patent: Jul. 28, 2020

(54) CYLINDER HEAD OF INTERNAL COMBUSTION ENGINE

(71) Applicant: TOYOTA JIDOSHA KABUSHIKI KAISHA, Aichi-ken (JP)

(72) Inventor: Shintaro Hotta, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/383,665

(22) Filed: Apr. 15, 2019

(65) Prior Publication Data
US 2019/0323417 A1 Oct. 24, 2019

(30) Foreign Application Priority Data
Apr. 18, 2018 (JP) .................................. 2018-080141

(51) Int. Cl.
*F02B 23/00* (2006.01)
*F02F 1/24* (2006.01)
*F02B 23/10* (2006.01)

(52) U.S. Cl.
CPC ...... *F02B 23/105* (2013.01); *F02B 2023/106* (2013.01); *F02F 1/24* (2013.01)

(58) Field of Classification Search
CPC .... F02B 23/00; F02B 23/08; F02B 2023/106; F02F 1/24
See application file for complete search history.

(56) References Cited

U.S. PATENT DOCUMENTS

| 4,957,081 A * | 9/1990 | Ito ............................. F01L 3/22 123/193.5 |
| 5,601,061 A * | 2/1997 | Dam ......................... F01L 3/06 123/142.5 E |
| 9,038,592 B2 * | 5/2015 | Gonsowski ........... F02F 1/4235 123/188.2 |
| 10,107,147 B2 * | 10/2018 | Yoshihara ............. F02F 1/4221 |
| 2008/0149063 A1 * | 6/2008 | Denger ..................... F01L 3/06 123/193.6 |
| 2010/0037840 A1 * | 2/2010 | Amano ..................... F01L 3/06 123/90.5 |
| 2011/0146620 A1 * | 6/2011 | Kaneko ................. F02B 23/105 123/305 |

(Continued)

FOREIGN PATENT DOCUMENTS

| JP | S63-113117 A | 5/1988 |
| JP | 2011-132833 A | 7/2011 |

*Primary Examiner* — Thomas N Moulis
(74) *Attorney, Agent, or Firm* — Hauptman Ham, LLP

(57) ABSTRACT

An internal combustion engine includes a plurality of cylinders, and these cylinders are divided into a first group where the air-fuel mixture is burned in the entire operating region and a second group where the air-fuel mixture is not burned in part of the operating region. The engine comprising: an intake opening opened and closed by an intake valve; an exhaust opening opened and closed by an exhaust valve; and a mask part having a wall surface extending along an outer edge of the intake opening toward the inside of the combustion chamber at an opposite side from the exhaust opening side. The mask part is configured so that a clearance from a passage surface of an edge part of the intake valve to the wall surface of the mask part is smaller at each cylinder of the first group than each cylinder of the second group.

7 Claims, 8 Drawing Sheets

(56) References Cited

U.S. PATENT DOCUMENTS

2012/0160198 A1\* 6/2012 Durando ................. F01L 9/025
123/90.16
2016/0195027 A1\* 7/2016 Mori ..................... F02B 23/104
123/309

\* cited by examiner

NO MASK

CLEARANCE 1.8mm

CLEARANCE 1.0mm

CYLINDER HEAD OF INTERNAL COMBUSTION ENGINE

RELATED APPLICATIONS

The present application claims priority of Japanese Application Number 2018-080141, filed on Apr. 18, 2018, the disclosure of which is hereby incorporated by reference herein in its entirety.

FIELD

The present invention relates to a cylinder head of an internal combustion engine.

BACKGROUND

In the past, it has been proposed to provide mask parts around intake openings opened and closed by intake valves (for example, Japanese Patent Publication No. 2011-132833 A and Japanese Patent Publication No. S63-113117 A). The mask parts are provided with wall surfaces formed so as to extend along the outer peripheries of the intake openings toward the inside of the combustion chamber, at the opposite sides to the exhaust opening sides (below, referred to as the "opposite exhaust opening sides").

The wall surfaces of such mask parts function as flow resistances against the intake gas taken in from the intake ports into the combustion chamber, when the intake valves are lifted. The intake gas passing through regions positioned at the opposite exhaust opening sides of the intake openings is thereby prohibited or inhibited from flowing into the combustion chamber. As a result, a reverse tumble flow is kept from being generated in the combustion chamber and a strong normal tumble flow is formed in the combustion chamber.

SUMMARY

Technical Problem

In this regard, known in the past has been an internal combustion engine which performs cylinder suspension control suspending combustion of the air-fuel mixture at part of the cylinders among a plurality of cylinders, in part of the operating region of the internal combustion engine. In such an internal combustion engine, at a suspended cylinder suspended during the cylinder suspension control, mainly when the engine load is high to a certain extent, the air-fuel mixture is burned, while when the engine load is low, the air-fuel mixture is not burned. On the other hand, in an operating cylinder which operates even during cylinder suspension control, the air-fuel mixture is burned even when the engine load is low.

Further, in general, as the disturbance of the intake gas occurring in a combustion chamber is smaller, it is harder for the fuel to mix with the air, and therefore the duration of combustion of the air-fuel mixture is longer. As the duration of combustion is longer, the degree of the constant volume at the combustion occurring in the combustion chamber is decreased, and accordingly a deterioration of the fuel efficiency is deteriorated or the output power is dropped.

As explained above, a suspended cylinder and an operating cylinder differ mainly in the operating states in which the air-fuel mixture is burned. Therefore, from the viewpoint of the suppression of deterioration of the fuel efficiency and a drop in output power, it is necessary that, in the suspended cylinder, when the engine load is high to a certain extent, the disturbance of the intake gas is greater. Conversely, it is necessary that in an operating cylinder, the disturbance of the intake gas is greater even when the engine load is low to a certain extent. However, in the internal combustion engines according to the above-mentioned JP 2011-132833 A and JP S63-113117 A, this point is not considered.

The present invention was made in consideration of the above problem and has as its object to provide an internal combustion engine in which cylinder suspension control is performed wherein the disturbance of the intake gas occurring in a combustion chamber is increased both when cylinder suspension control is being performed and when it is not being performed.

Solution to Problem

The present invention was made so as to solve the above problem and has as its gist the following.

[1] An internal combustion engine comprising a plurality of cylinders, these cylinders divided into a first group of cylinders where the air-fuel mixture is burned in the entire operating region where output power is necessary and a second group of cylinders where the air-fuel mixture is not burned in part of the operating region in the operating region where output power is necessary, the internal combustion engine comprising:
  an intake opening facing a combustion chamber of each cylinder and opened and closed by an intake valve;
  an exhaust opening facing a combustion chamber of each cylinder and opened and closed by an exhaust valve; and
  a mask part having a wall surface extending along an outer periphery of the intake opening toward the inside of the combustion chamber at an opposite side from the exhaust opening side in the direction extending through the center of an entire of the intake opening and the center of an entire of the exhaust opening,
  wherein the mask part is configured so that a clearance from a passage surface of an edge part of the intake valve to the wall surface of the mask part is smaller at each cylinder of the first group of cylinders than each cylinder of the second group of cylinders.

[2] The internal combustion engine according to above [1], wherein the mask part of each cylinder of the first group of cylinders is configured so that the clearance is less than Cl calculated by the following formula (1), and the mask part of each cylinder of the second group of cylinders is configured so that the clearance is equal to or greater than Cl calculated by the following formula (1):

$$Cl = -(h \cdot NEm + j \cdot Pm + f)/2n - 0.8 \tag{1}$$

in which formula (1), NEm is a rotational speed (rpm) at an maximum output power point, Pm is an intake pipe pressure (kPa) at the maximum output power point, h=0.0000788, j=−0.003585, f=0.6531914, and n=−0.0621023.

[3] The internal combustion engine according to above [2], wherein the mask part of each cylinder of the second group of cylinders is configured so that the clearance is equal to or less than Ch calculated by the following formula (2):

$$Ch = -(h \cdot NEm + j \cdot Pm + f)/2n + 0.8 \tag{2}$$

[4] The internal combustion engine according to above [1], wherein the mask part of each cylinder of the first group of cylinders is configured so that the clearance is less than 1.8 mm and the mask part of each cylinder of the second group of cylinders is configured so that the clearance is equal to or greater than 1.8 mm.

[5] The internal combustion engine according to above [2], wherein the mask part of each cylinder of the second group of cylinders is configured so that the clearance is equal to or less than 3.4 mm.

[6] The internal combustion engine according to any one of above [1] to [5], further comprising a cylinder head in which the intake opening, the exhaust opening, and the mask part are formed,
wherein the edge part of the wall surface the most at the lift direction side of the intake valve is positioned on a surface of the cylinder head abutting against a cylinder block.

[7] The internal combustion engine according to any one of above [1] to [6], wherein the wall surface is formed so that the clearance from the passage surface of the edge part of the intake valve becomes constant in the circumferential direction at different positions in the lift direction of the intake valve.

Advantageous Effects of Invention

According to the present invention, in an internal combustion engine where cylinder suspension control is performed, the disturbance of the intake gas occurring in a combustion chamber is larger even when cylinder suspension control is being performed and when it is not being performed.

DESCRIPTION OF EMBODIMENTS

Figure 1:
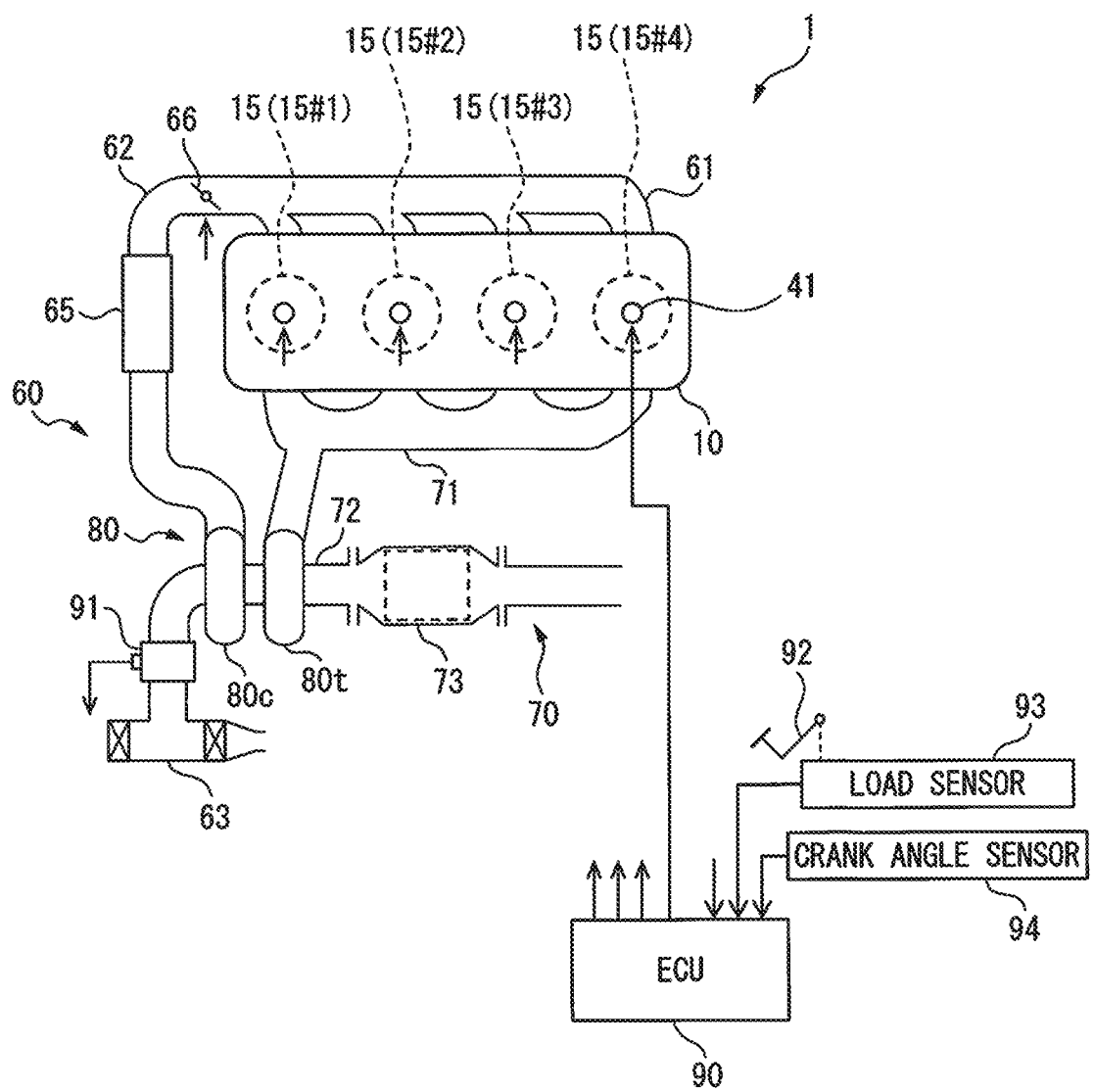
FIG. 1 is a schematic view of the configuration of an internal combustion engine.

Below, referring to the drawings, embodiments of the present invention will be explained in detail. Note that in the following explanation, similar components are assigned the same reference notations.

Figure 2:
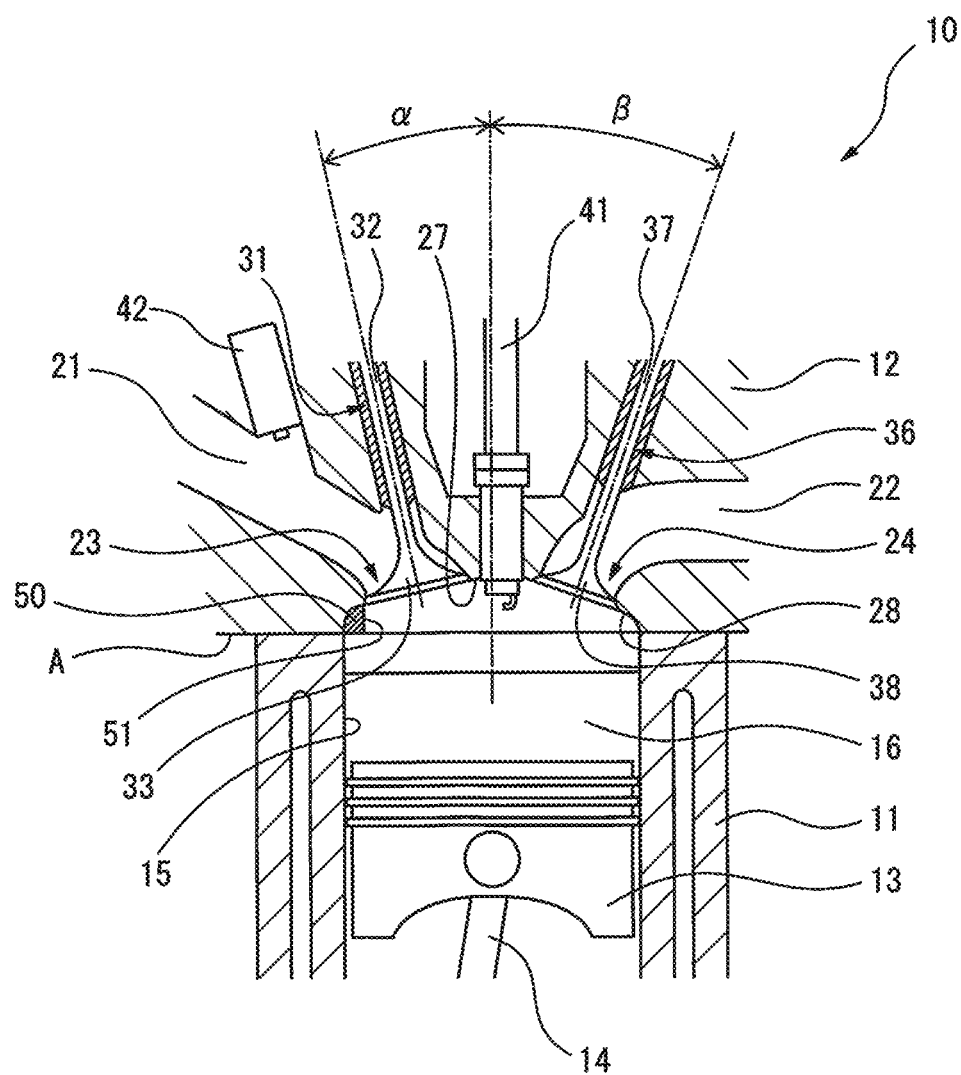
FIG. 2 is a partial cross-sectional view schematically showing an internal combustion engine according to one embodiment.

Explanation of Entire Internal Combustion Engine First, referring to FIGS. 1-4, a configuration of an internal combustion engine according to one embodiment will be explained. FIG. 1 is a view of the configuration of the internal combustion engine 1 according to one embodiment, while FIG. 2 is a partial cross-sectional view schematically showing the internal combustion engine according to one embodiment. As shown in FIG. 1, the internal combustion engine 1 is provided with engine body 10, intake system 60, exhaust system 70 and control device 40.

As shown in FIG. 2, the internal combustion engine 1 is provided with a cylinder block 11, a cylinder head 12, pistons 13, and a connecting rod 14.

The cylinder block 11 is provided with a plurality of cylinders 6 arranged aligned. In particular, the internal combustion engine 1 according to the present embodiment includes four cylinders 15#1-15#4. The cylinder head 12 is arranged so as to abut against the cylinder block 11 at an abutting surface A and is arranged so as to close off first openings of the cylinders 15 formed at the cylinder block 11. Note that the internal combustion engine 1 according to the present embodiment is in-line 4-cylinder engine, however, may be a various type of internal combustion engine such as in-line 4-cylinder engine, or V-type 6-cylinder engine.

Each piston 13 is arranged so as to reciprocate through the inside of a cylinder 15 formed in the cylinder block 11. The piston 13 is connected through a piston pin to the connecting rod 14. The connecting rod 14 is connected through a crank pin to a crankshaft (not shown), and acts to convert the reciprocating motion of the piston 13 to rotary motion of the crankshaft. Further, the wall surface of a cylinder 15 of the cylinder block 11, the cylinder head 12 and piston 13 form a combustion chamber 16 in which the air-fuel mixture is burned.

Figure 3:
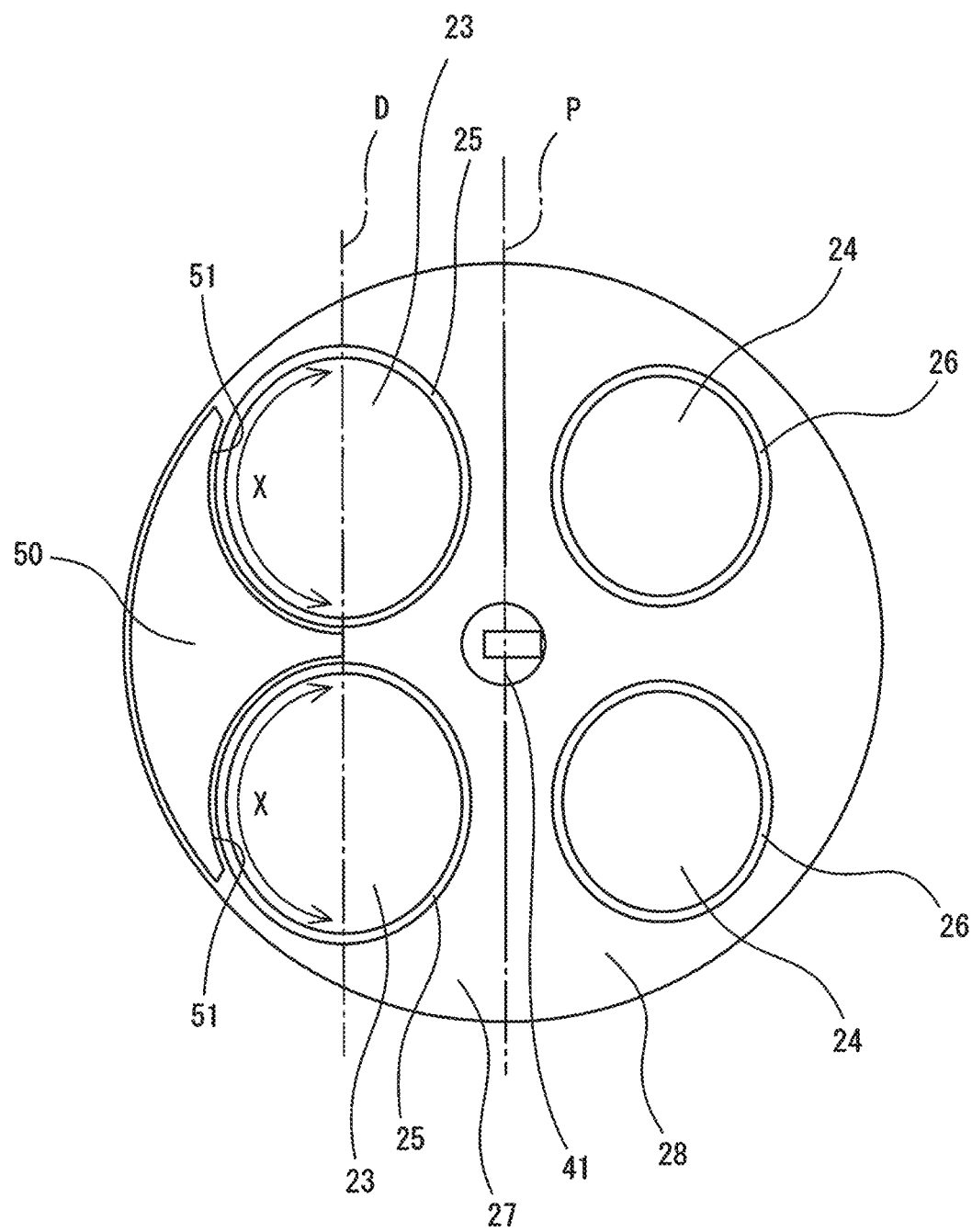
FIG. 3 is a top view schematically showing a top surface of one combustion chamber.
Figure 4:
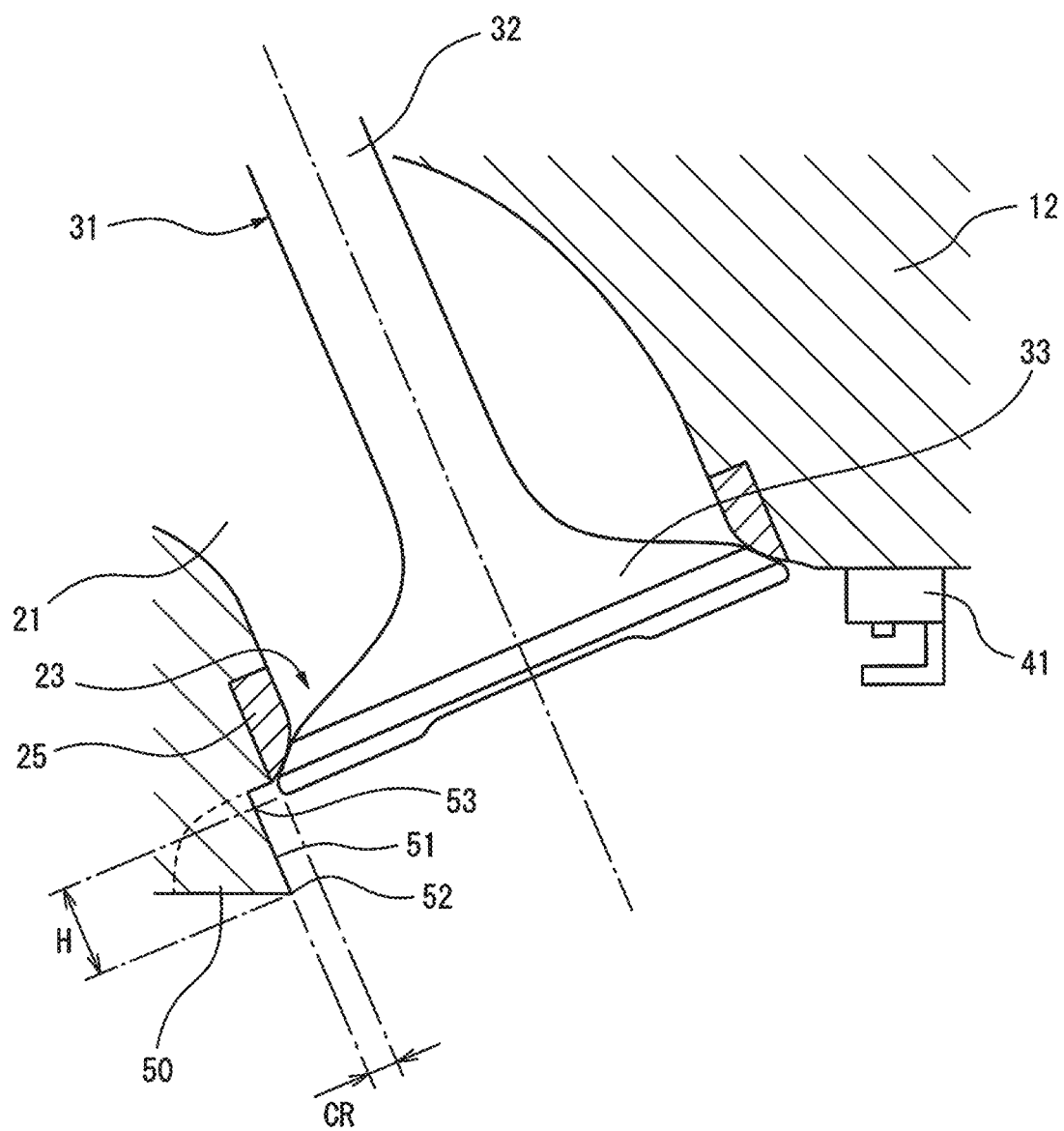
FIG. 4 is an enlarged cross-sectional view showing enlargedly a vicinity of the intake opening of FIG. 2.

FIG. 3 is a top view schematically showing the top surface of one combustion chamber 16. Therefore, FIG. 3 schematically shows the bottom surface of the cylinder head 12 positioned so as to close one cylinder 15. FIG. 4 is an enlarged cross-sectional view showing enlargedly a vicinity of the intake opening of FIG. 2.

As shown in FIG. 1, the cylinder head 12 is formed with intake ports 21 and exhaust ports 22. As shown in FIGS. 2 and 3, the intake ports 21 face the combustion chambers 16, and communicate with the combustion chambers 16 through intake openings 23 formed at the cylinder head 12. Similarly, the exhaust ports 22 face the combustion chambers 16, and communicate with the combustion chambers 16 through exhaust openings 24 formed at the cylinder head 12.

As shown in FIG. 3, in the present embodiment, at each combustion chamber 16, two intake openings 23 and two exhaust openings 24 are provided. The two intake openings 23 are arranged aligned in the same direction as the direction which the plurality of cylinders 15 are aligned (below, referred to as the "cylinder arrangement direction"). Similarly, the two exhaust openings 24 are arranged aligned in the same direction as the cylinder arrangement direction. The two intake openings 23 are arranged at one side of the center plane P extending through the center of the cylinder 15 and extending in the cylinder arrangement direction, while the two exhaust openings 24 are arranged at the other side.

Note that, in this Specification, the direction extending through the center of an entire of the intake openings and the center of an entire of the exhaust openings (in this embodiment, the direction perpendicular to the cylinder arrangement direction) and heading from the center plane P to the intake openings 23, that is, the direction from the exhaust openings 24 toward the intake openings 23, will be referred to as the "opposite exhaust opening side" or "opposite exhaust opening direction", while the direction perpendicular to the cylinder arrangement direction and heading from the center plane P to the exhaust openings 24, that is, the direction from the intake openings 23 toward the exhaust openings 24, will be referred to as the "exhaust opening side" or "exhaust opening direction". Note that, if a plurality of the intake openings 23 are provided in the engine, the center of the entire of the intake openings 23 means the center of barycenters of the intake openings 23. Similarly, if a plurality of the exhaust openings 24 are provided in the engine, the center of the entire of the exhaust openings 24 means the center of barycenters of the exhaust openings 24.

Further, as shown in FIG. 3, intake seat parts 25, at which the intake valves 31 (explained later) abut at the time of valve closure, are provided over the entire circumferences around the edge parts of the intake openings 23. Similarly, exhaust seat parts 26, at which the exhaust valves 36 (explained later) abut at the time of valve closure, are provided over the entire circumferences around the edge parts of the exhaust openings 24. The intake seat parts 25 may be formed as valve seats separate from the cylinder head 12 as shown in FIG. 4 or may be seats directly formed at the cylinder head 12.

As shown in FIG. 2, the cylinder head 12 is formed so that the top surface of each combustion chamber 16 has two slanted surfaces of the intake side slanted surface 27 and the exhaust side slanted surface 28. The intake side slanted surface 27 is formed so that the height from the abutting surface A (length from abutting surface A in axial direction of cylinder 15) becomes higher from the edge part of the intake opening side toward the center plane P. The exhaust side slanted surface 28 is formed so that the height from the abutting surface A becomes higher from the edge part of the exhaust opening side toward the center plane P. Therefore, the top surface of the combustion chamber 16 is slanted so as to become highest at the center plane P. Note that the top surface of the combustion chamber 16 may not necessarily formed so as to be highest at the center plane P, as long as the top surface includes a slanted surface in which the height becomes higher from the intake opening side toward the center and a slated surface in which the height becomes higher from the exhaust opening side toward the center.

Further, the cylinder head 12 is provided with intake valves 31 opening and closing the intake openings 23, exhaust valves 36 opening and closing the exhaust openings 24, and spark plugs 41 igniting an air-fuel mixture in the combustion chambers 16. Further, the cylinder head 12 is provided with fuel injector 42 injecting fuel into the intake port 21.

Each intake valve 31 is provided with a valve stem 32 and a valve head 33 fixed to one end of the valve stem 32. The intake valve 31 is arranged in the cylinder head 12 to be able to slide in the direction in which the valve stem 32 extends, that is, the axial direction of the intake valve 31. The intake valve 31 is lifted in its axial direction by an intake valve operating mechanism (not shown). The intake valve operating mechanism may be a variable valve operating mechanism able to change at least one of an operating angle, phase angle, and maximum amount of lift of the intake valve 31, or may be a valve operating mechanism unable to change these.

Similarly, each exhaust valve 36 is provided with a valve stem 37 and a valve head 38 fixed to one end of the valve stem 37. The exhaust valve 36 is arranged in the cylinder head 12 to be able to slide in the direction in which the valve stem 37 extends, that is, the axial direction of the exhaust valve 36. The exhaust valve 36 is lifted in the axial direction by the exhaust valve operating mechanism (not shown). The exhaust valve operating mechanism may be a variable valve operating mechanism able to change at least one of an operating angle, phase angle, and maximum lift of the exhaust valve 36, or may be a valve operating mechanism unable to change these.

Each spark plug 41 is attached to the cylinder head 12 so as to be positioned at the top surface of a combustion chamber 16 at the substantial center of the combustion chamber 16.

Note that, in the present embodiment, a fuel injector 42 injecting fuel into the intake port 21 is provided, but it is also possible to provide a fuel injector directly injecting fuel into the combustion chamber 16 at the cylinder head 12, instead of this fuel injector 42 or in addition to this fuel injector 42. In this case, the fuel injector is disposed so that its injection nozzle is positioned in proximity to the spark plug 41 or is positioned between two intake openings 23 at the opposite exhaust opening side from the intake opening 23.

Further, in the present embodiment, the spark plug 41 is provided so as to be exposed in the combustion chamber 16, but the spark plug 41 need not be provided. In this case, the fuel injection from a fuel injector directly injecting fuel into the combustion chamber 16 is controlled so that the air-fuel mixture self ignites at the combustion chamber 16.

The intake system 60 is provided with intake runners 61, an intake pipe 62, an air cleaner 63, a compressor 80$c$ of an exhaust turbocharger 80, an intercooler 65, and a throttle valve 66. The intake ports 21 of the cylinders 15 are respectively communicated with the intake pipe 62 through the corresponding intake runners 61, while the intake pipe 62 is communicated with the air cleaner 63. The intake pipe 62 is provided with the compressor 80$c$ of the exhaust turbocharger 80 for compressing and discharging the intake air flowing through the intake pipe 62 and the intercooler 65 for cooling the air compressed by the compressor 80$c$. The throttle valve 66 can be turned by a throttle valve drive actuator to thereby change the open area of the intake passage. Note that, the intake port 21, intake runners 61, and intake pipe 62 form the intake passage supplying intake gas to the combustion chambers 16.

The exhaust system 70 is provided with an exhaust manifold 71, exhaust pipe 72, turbine 80$t$ of an exhaust turbocharger 80, and exhaust post-treatment device 73. The exhaust ports 22 of the cylinders 15 are communicated with the exhaust manifold 71, while the exhaust manifold 71 is communicated with the exhaust pipe 72. The exhaust pipe 72 is provided with the turbine 80$t$ of the exhaust turbocharger 80. The turbine 80$t$ can be driven to rotate by the energy of the exhaust gas. If the turbine 80$t$ is driven to rotate, the compressor 80$c$ rotates and accordingly the intake air is compressed. Further, the exhaust pipe 72 is provided with the exhaust post-treatment device 73 at the downstream side of the turbine 80$t$ in the direction of the flow of exhaust. The exhaust post-treatment device 73 is a device for purifying the exhaust gas, then discharging it into the outside air, and is provided with, for example, various exhaust purification catalysts removing harmful substances and a filter for trapping harmful substances. Note that, the exhaust port 22, exhaust manifold 71, and exhaust pipe 72 form an exhaust passage discharging the exhaust gas from the combustion chambers 16.

The control device is provided with an electronic control unit (ECU) 90 and various types of sensors. The ECU 90 is comprised of a digital computer and is provided with components connected with each other through a bidirectional bus, such as a memory, CPU (microprocessor), input port, and output port. The sensors, for example, include an air flow meter 91 for detecting the amount of flow of air flowing through the inside of the intake pipe 62, a load sensor 93 for detecting the engine load with an output current changing in accordance with the output of an accelerator 92, a crank angle sensor 94 for detecting a rotational speed of the internal combustion engine 1, etc. The input port of the ECU 90 is connected to these sensors.

On the other hand, the output port of the ECU 90 is connected to the spark plugs 41, fuel injectors 42, throttle valve drive actuator, and other actuators. These actuators are controlled by drive signals from the ECU 90.

Cylinder Suspension Control

The control device of the internal combustion engine 1 performs cylinder suspension control in which burning of the air-fuel mixture in a combustion chamber 16 is prevented in part of the operating region in the operating region where output power is required. Below, this cylinder suspension control will be explained.

During this cylinder suspension control, in part of the cylinders 15 of the internal combustion engine 1, the air-fuel mixture in the combustion chamber 16 is not burned. In the remaining cylinders 15, the air-fuel mixture in the combustion chamber 16 is burned. For example, during this cylinder suspension control, the air-fuel mixture is burned in the No. 1 cylinder 15#1 and the No. 4 cylinder 15#4, while the air-fuel mixture is not burned in the No. 2 cylinder 15#2 and the No. 3 cylinder 15#3.

Below, the group of cylinders in which the air-fuel mixture is not burned during cylinder suspension control will be referred to as the "group of suspended cylinders", while the group of cylinders in which the air-fuel mixture is burned even during cylinder suspension control will be referred to as the "group of operating cylinders". Therefore, in the above explained example, the No. 2 cylinder 15#2 and No. 3 cylinder 15#3 are cylinders of the group of suspended cylinders, while the No. 1 cylinder 15#1 and No. 4 cylinder 15#4 are cylinders of the group of operating cylinders.

At a cylinder 15 of the group of suspended cylinders during cylinder suspension control, the intake valve 31 and exhaust valve 36 are maintained closed during the cylinder suspension control. Therefore, the cylinder 15 of the group of suspended cylinders is not supplied with a new air-fuel mixture. As a result, the air-fuel mixture is not burned. In the cylinder 15 of the group of suspended cylinders, the gas in the combustion chamber is repeatedly adiabatically compressed and adiabatically expanded.

Figure 5:
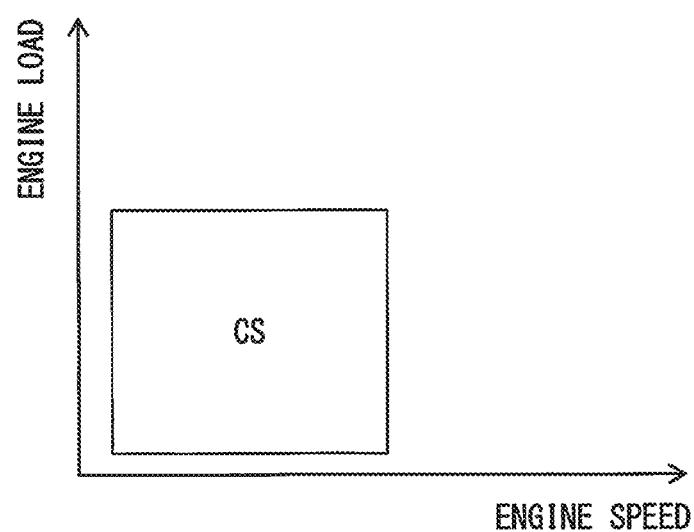
FIG. 5 is a view showing an operating region in which cylinder suspension control is performed.

FIG. 5 is a view showing an operating region where cylinder suspension control is performed. When the engine operating state, which is determined from the engine rotational speed and the engine load, is in the region CS, cylinder suspension control is performed. On the other hand, when the engine operating state is not in the region CS, cylinder suspension control is not performed and the air-fuel mixture is burned in all of the cylinders. In the present embodiment, the cylinder suspension control is controlled on and off based on the engine rotational speed detected by the crank angle sensor 94 and the engine load detected by the load sensor 93.

Note that, the cylinder suspension control is performed at the region CS which is a part of the operating region where output power of the internal combustion engine 1 is necessary. Therefore, it need not be performed in an operating region where output power of the internal combustion engine 1 is unnecessary such as during deceleration of the vehicle mounting the internal combustion engine 1. In such an operating region, for example, fuel cut control is performed in which the supply of fuel from the fuel injectors 42 is stopped in all of the cylinders.

Configuration of Mask Part

As shown in FIGS. 2 to 4, the cylinder head 12 of the present embodiment is provided with a mask part 50 provided at an opposite exhaust opening side of the intake opening 23. The mask part 50 is formed so as to project from the top surface of a combustion chamber 16 toward the inside of the combustion chamber 16. The mask part 50 may be formed integrally with the cylinder head 12 or may be formed as a separate member from the cylinder head 12.

The mask part 50 has a wall surface 51 extending along the outer periphery of an intake opening 23 and along the outer edge of the intake seat part 25 around the intake opening 23. In particular, the wall surface 51 is formed so as to extend entirely or in part at the inside of the region at the opposite exhaust opening side from the center plane D extending in the cylinder array direction of the intake opening 23 (region shown by X in FIG. 3). That is, the wall surface 51 extends along the outer periphery of the intake opening 23 toward the inside of the combustion chamber 16 at the opposite exhaust opening side. The wall surface 51 is preferably formed so as to extend over a region equal to or greater than half of the region shown by X in FIG. 3.

Further, the wall surface 51 extends from near the outer periphery of the intake opening 23 toward the inside of the combustion chamber 16. In the present embodiment, the wall surface 51 extends in the lift direction of the intake valve 31 up to the abutting surface A of the cylinder head 12. Therefore, the edge part 52 of the wall surface 51 in the lift direction of the intake valve 31 (below, also referred to as the "lift direction side edge part") is positioned on the abutting surface A of the cylinder head 12. The wall surface 51 extending up to the abutting surface A in this way means the mask part 50 projects out toward the inside of the combustion chamber 16 to the abutting surface A. By the mask part 50 projecting out to the abutting surface A in this way, the mask part 50 will not project out from the abutting surface A of the cylinder head and accordingly the cylinder head 12 can be easily assembled with the cylinder block 11.

Note that, the wall surface 51 does not necessarily extend up to the abutting surface A of the cylinder head 12 in the lift direction of the intake valve 31. Therefore, the wall surface 51 may be formed so that the height of the intake valve 31 in the lift direction (axial direction) at least partially is lower than the height reaching the abutting surface A of the cylinder head 12. In this case, the wall surface 51, for example, is formed so as to extend up to the abutting surface A in the region positioned at the most opposite exhaust opening side of the intake opening 23 and to not extend up to the abutting surface A in the region positioned at the cylinder array direction side of the intake opening 23. Further, the wall surface 51 may also be formed so as to extend beyond the abutting surface A toward the inside of the combustion chamber 16, although it becomes difficult to assemble the cylinder head 12 at the cylinder block 11.

In addition, in the present embodiment, the wall surface 51 of the mask part 50 is formed so that the clearance CR from the passage surface of the edge part of the intake valve 31 (below, also simply referred to as "the clearance of the wall surface") is constant. Therefore, the wall surface 51 of the mask part 50 is formed so as to extend in parallel with the passage surface of the edge part of the intake valve 31. Note that, the passage surface of the edge part of the intake valve 31 means the surface formed by the path of the edge part of the valve body 33 when the valve body 33 of the intake valve 31 moves in the axial direction of the intake valve 31 due to the intake valve 31 being lifted.

In the present embodiment, the clearance CR of the wall surface 51 is a different value between a cylinder 15 of the group of suspended cylinders and a cylinder 15 of the group of operating cylinders. Specifically, the clearance CR of the wall surface 51 is smaller at a cylinder 15 of the group of operating cylinders, compared with a cylinder 15 of the group of suspended cylinders.

Specifically, in the present embodiment, at a cylinder 15 of the group of operating cylinders, the clearance CR of the wall surface 51 is configured to be less than Cl calculated by the following formula (1), while at a cylinder 15 of the group of suspended cylinders, the clearance CR of the wall surface 51 is configured to be equal to or greater than Cl calculated by the following formula (1) and equal to or less than Ch calculated by the following formula (2):

$$Cl = -(h \cdot NEm + j \cdot Pm + f)/2n - 0.8 \quad (1)$$

$$Ch = -(h \cdot NEm + j \cdot Pm + f)/2n + 0.8 \quad (2)$$

In this regard, in the above formulas (1) and (2), NEm is the rotational speed (rpm) at the maximum output power point, Pm is the pressure in the intake port 21 or the intake runners 61 at the maximum output power point (intake pipe pressure) (kPa), $h=0.0000788$, $j=-0.003585$, $f=0.6531914$, and $n=-0.0621023$.

Further, at a cylinder 15 of the group of suspended cylinders, the clearance CR of the wall surface 51 is preferably configured to be equal to or greater than Cl2 calculated by the following formula (3) and equal to or less than Ch2 calculated by the following formula (4). Furthermore, at a cylinder 15 of the group of suspended cylinders, the clearance CR of the wall surface 51 is more preferably configured to be equal to or greater than Cl3 calculated by the following formula (5) and equal to or less than Ch3 calculated by the following formula (6):

$$Cl2 = -(h \cdot NEm + j \cdot Pm + f)/2n - 0.4 \quad (3)$$

$$Ch2 = -(h \cdot NEm + j \cdot Pm + f)/2n + 0.4 \quad (4)$$

$$Cl3 = -(h \cdot NEm + j \cdot Pm + f)/2n - 0.2 \quad (5)$$

$$Ch3 = -(h \cdot NEm + j \cdot Pm + f)/2n + 0.2 \quad (6)$$

Alternatively, in the present embodiment, at a cylinder 15 of the group of operating cylinders, the clearance CR of the wall surface 51 is configured to be less than 1.8 mm, while at a cylinder 15 of the group of suspended cylinders, the clearance CR of the wall surface 51 is configured to be 1.8 mm to 3.4 mm. Further, at a cylinder 15 of the group of operating cylinders, the clearance CR of the wall surface 51 is preferably configured to be equal to or less than 1.4 mm and is more preferably configured to be equal to or less than 1.0 mm. On the other hand, at a cylinder 15 of the group of suspended cylinders, the clearance CR of the wall surface 51 is preferably configured to be 2.2 mm to 3.0 mm and is more preferably configured to be 2.4 mm to 2.8 mm.

On the other hand, the clearance CR is formed to be constant in the circumferential direction of the intake opening 23 at different positions in the lift direction of the intake valve 31. Therefore, the wall surface 51 is formed to an arc shape centered on the axis of the intake valve 31 at the different positions in the lift direction of the intake valve 31.

Action and Effects

Figure 6:
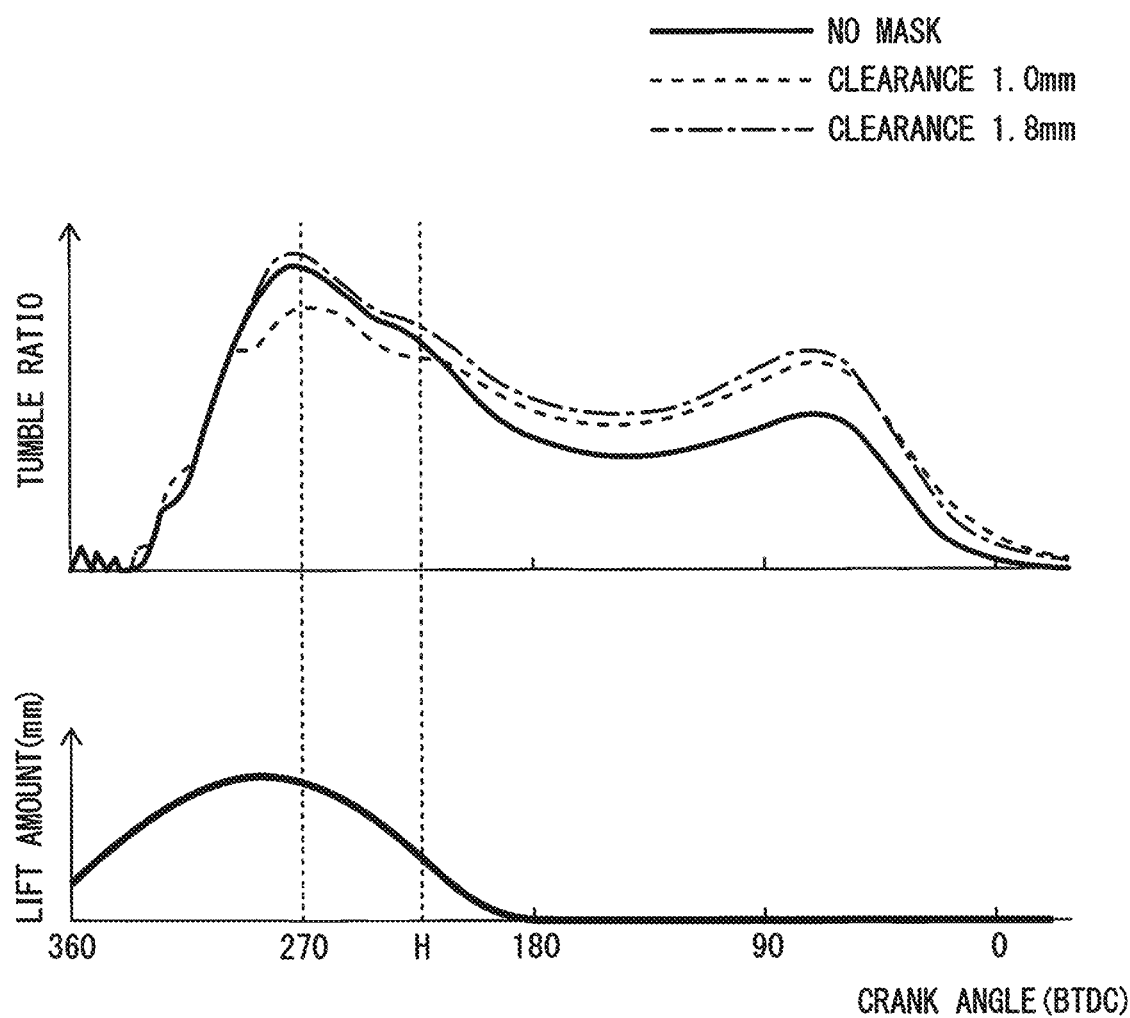
FIG. 6 shows transitions, with respect to crank angle, in a strength of disturbance generated in each combustion chamber and a lift amount of the intake valve.

Next, referring to FIGS. 6 to 8, the action and effects in the present embodiment will be explained. FIG. 6 shows the transitions, with respect to crank angle, in the tumble ratio of the tumble flow generated in each combustion chamber 16 and the lift amount of the intake valve 31. The abscissa of FIG. 6 shows the angle at the advanced side from compression top dead center. Therefore, 0° BTDC of FIG. 6 shows the state where the piston 13 is at compression top dead center, while 180° BTDC shows the state where the piston 13 is at suction bottom dead center. In particular, FIG. 6 shows the transitions, with respect to crank angle, in the tumble ratio at the operating state where the output of the internal combustion engine is maximum (maximum output power point).

Further, the solid line in the figure shows the transition in the case where the cylinder head 12 is not provided with a mask part. On the other hand, the broken line and one-dot chain line in the figure show the transitions in the case where the clearance CR of the wall surface 51 is 1.0 mm and 1.8 mm over the entire height direction (therefore, a step difference is not provided), respectively. Further, FIG. 6 shows the transitions in the case where the height of the wall surface 51 of the mask part is H.

If the intake stroke is started from 360° BTDC, as shown in FIG. 6, the lift amount of the intake valve 31 increases, and along with this intake gas flows into the combustion chamber 16. At the time of start of the intake stroke, the amount of flow of the intake gas flowing into the the combustion chamber 16 does not become that great, therefore no tumble flow is formed in the combustion chamber 16, and therefore the tumble ratio remains low. After that, if the lift amount of the intake valve 31 increases and the speed of descent of the piston 13 rises, the amount of flow of intake gas flowing into the combustion chamber 16 also increases and the tumble ratio of the tumble flow formed in the combustion chamber 16 also becomes greater. Further, at 270° BTDC, the speed of descent of the piston 13 becomes maximum, and along with this the tumble ratio of the tumble flow formed in the combustion chamber 16 also becomes maximum.

As will be understood from FIG. 6, near 270° BTDC, the tumble ratio in the case where a mask part with a clearance of 1.0 mm is provided, is smaller compared with the tumble ratio in the case where the mask part is not provided and the case where a mask part with a clearance of 1.8 mm is provided. Below, referring to, FIGS. 7A to 7C, the reason why the tumble ratio of the tumble flow is small in the case where a mask part with a clearance of 1.0 mm is provided will be explained.

Figure 7A:
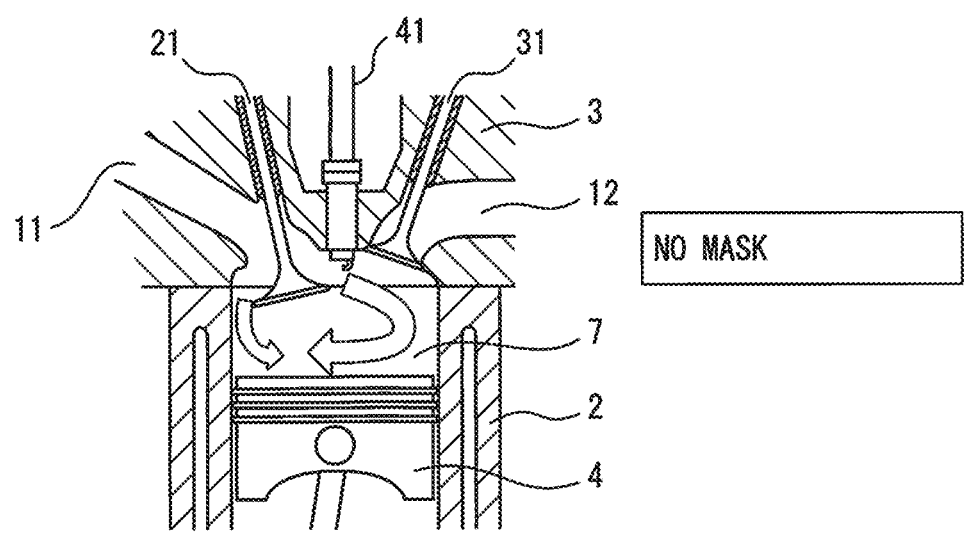
FIGS. 7A to 7C are views schematically showing a flow of intake gas formed in a combustion chamber at around 270° BTDC.
Figure 7B:
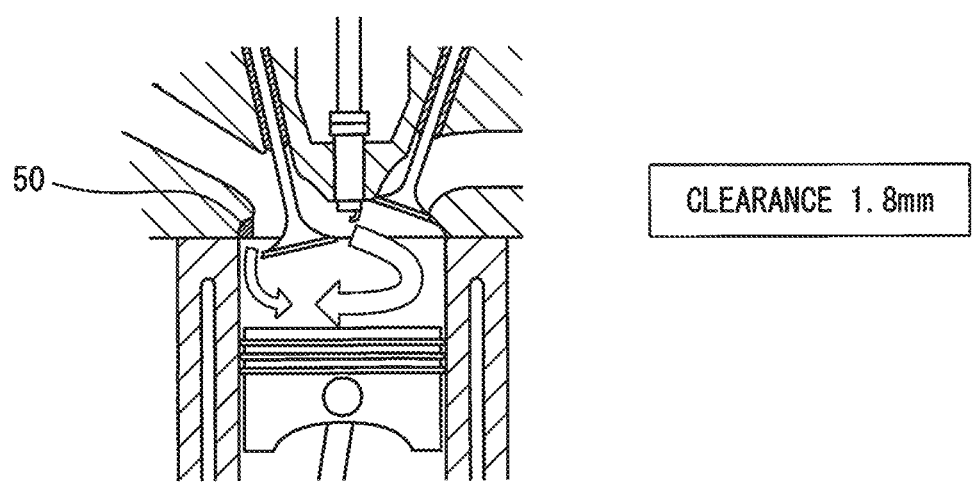
Figure 7C:
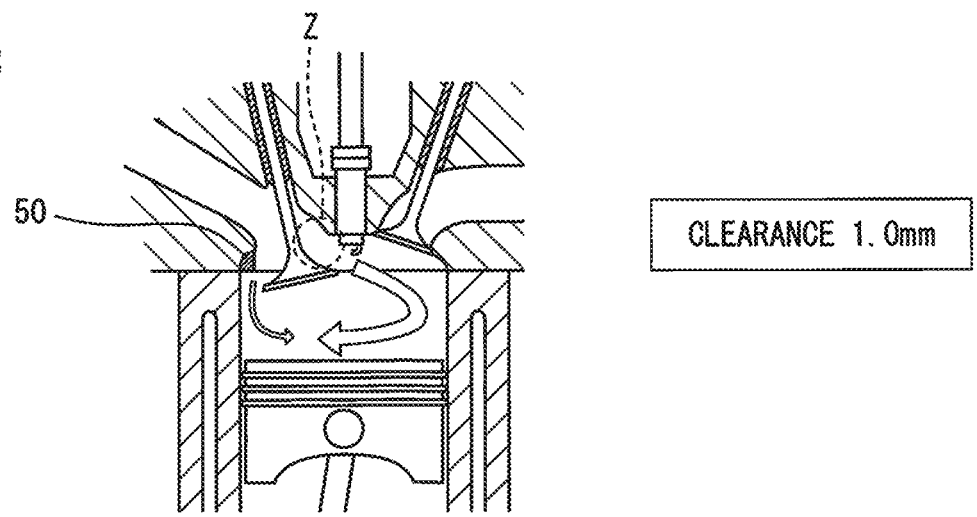

FIGS. 7A to 7C are views schematically showing the flow of intake gas formed in the combustion chamber 16 around 270° BTDC. FIG. 7A shows the case where no mask part is provided, FIG. 7B shows the case where a mask part with a clearance of 1.8 mm is provided, and FIG. 7C shows the case where a mask part with a clearance of 1.0 mm is provided.

In the case where no mask part is provided as shown in FIG. 7A, and in the case where a mask part with a clearance of 1.8 mm is provided as shown in FIG. 7B, when the lift amount of the intake valve 31 is large, the resistance to the intake gas is not that large even in the region at the opposite exhaust opening side of the intake opening 23. Therefore, in these cases, the intake gas flows into the combustion chamber 16 not only through the region at the exhaust opening side of the intake opening 23, but also the region at the opposite exhaust opening side. That is, the actual flow area when the intake gas flows into the combustion chamber 16 through the intake opening 23 is broad. As a result, the overall flow rate of the intake gas flowing into the combustion chamber 16 is relatively fast and accordingly the tumble ratio of the tumble flow formed in the combustion chamber 16 is larger.

On the other hand, in the case where a mask part with a clearance of 1.0 mm is provided as shown in FIG. 7C, the resistance to the intake gas at the region at the opposite exhaust opening side of the intake opening 23 is large. Therefore, in this case, the intake gas almost entirely flows through the region of the intake opening 23 at the exhaust opening side. The intake gas flowing through the region at the opposite exhaust opening side is small. That is, the actual flow area when the intake gas flows through the intake opening 23 into the combustion chamber 16 is narrower compared with the case shown in FIGS. 7A and 7B. In addition, the actual flow area of the intake opening 23 is narrow and almost all of the intake gas flows through the region Z at the exhaust opening side of the intake opening 23, therefore the amount of flow of the intake gas trying to flow through this region Z increases, and as a result choking occurs in this region Z. Therefore, in this case, the overall flow rate of the intake gas flowing into the combustion chamber 16 is slower than the cases shown in FIG. 7A or 7B and accordingly the tumble ratio of the tumble flow formed in the combustion chamber 16 is also small.

On the other hand, as will be understood from FIG. 6, after the lift amount of the intake valve 31 falls and reaches near the height H of the wall surface 51 of the mask part, if no mask part is provided, the strength of the disturbance rapidly falls. This is because the intake gas flowing in from the region at the opposite exhaust opening side of the intake opening 23 flows in in a direction reverse to the direction of the tumble flow (below, also referred to as the "reverse tumble direction"), and thus obstructs the flow of the tumble flow.

On the other hand, if a mask part with a clearance of 1.0 mm is provided, if the lift amount of the intake valve 31 falls to equal to or less than the height H, it is possible to suppress the inflow of intake gas from the region at the opposite exhaust opening side of the intake opening 23. Therefore, if a mask part with a clearance of 1.0 mm is provided, when the lift amount of the intake valve 31 falls to equal to or less than the height H, it is possible to suppress the inflow of the intake gas in the reverse tumble direction and accordingly, as shown in FIG. 6, it is possible to suppress the drop in the tumble ratio. In the case where a mask part with a clearance of 1.8 mm is provided, the extent of drop of the tumble ratio when the lift amount of the intake valve 31 falls to equal to or less than the height H, is an extent between the case where no mask part is provided and the case where a mask part with a clearance of 1.0 mm is provided.

Figure 8A:
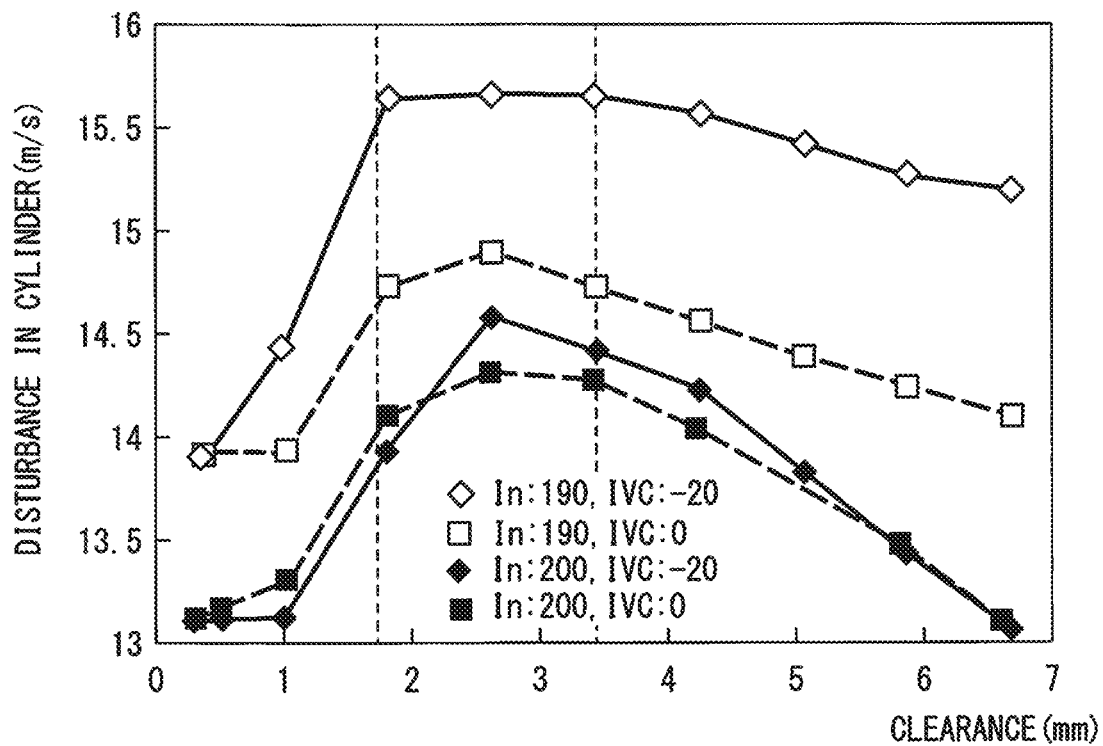
FIGS. 8A and 8B are views showing the relationship of the clearance of the wall surface and the strength of the disturbance generated in a combustion chamber.
Figure 8B:
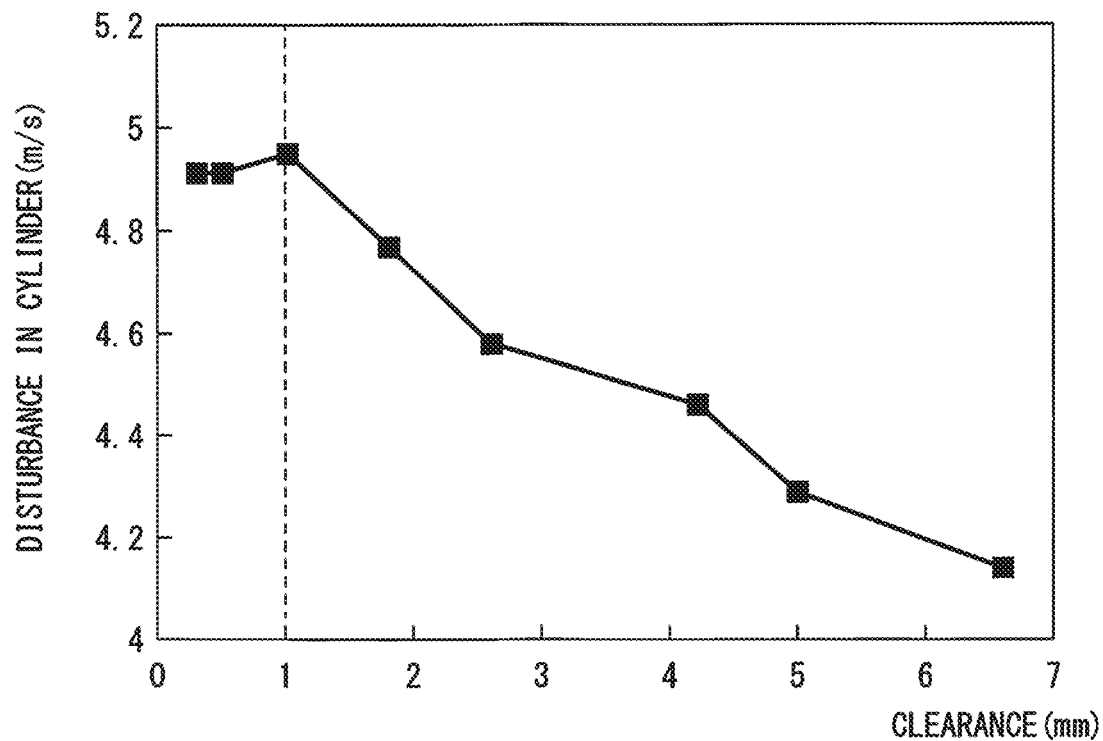

FIGS. 8A and 8B are views showing the relationship between the clearance CR of the wall surface 51 and the strength of the disturbance generated in the combustion chamber 16. FIG. 8A shows the relationship in the operating state where the output power of the internal combustion engine is maximum. On the other hand, FIG. 8B shows the relationship in the operating state with the highest frequency in the internal combustion engine 1.

Note that, the relationship between the clearance CR and the strength of disturbance shown in FIGS. 8A and 8B is the relationship in an internal combustion engine 1 of the following specifications. That is, in this internal combustion engine 1, the stroke/bore ratio is 1.14 to 1.17, the angle α between the intake valve 31 and the axis of the cylinder 15 is 18°, the angle β between the exhaust valve 36 and the axis of the cylinder 15 is 23° (see FIG. 2), and the intake port TTR (tumble ratio) is 2.6 to 2.8. The intake port TTR is a variable which changes in accordance with the shape of the intake port 21. Specifically, this means the tumble ratio of the tumble flow formed in the combustion chamber 16 when setting the lift amount L of the intake valve 31 to L/D=0.3 (D is the valve diameter of the intake valve 31) and sucking intake gas into the combustion chamber 16 by −30 kPa.

Further, the engine rotational speed at the maximum output power point of this internal combustion engine 1 is 5600 rpm, while the pressure in the intake port 21 or intake runner 61 at the maximum output power point (intake pipe pressure or supercharging pressure) is 200 kPa. Therefore, FIG. 8A shows the relationship when the engine rotational speed is 5600 rpm and the supercharging pressure is 200 kPa.

Further, in FIG. 8A, the white diamond shapes show the case where the operating angle of the intake valve 31 is 190° and the closing timing of the intake valve 31 is 20° to the advanced side from suction bottom dead center (−20° ABDC). Further, the white square shapes show the case where the operating angle of the intake valve 31 is 190° and the closing timing of the intake valve 31 is suction bottom dead center (0° ABDC). The black diamond shapes show the case where the operating angle of the intake valve 31 is 200° and the closing timing of the intake valve 31 is 20° to the advanced side from suction bottom dead center (−20° ABDC). Further, the black square shapes show the case where the operating angle of the intake valve 31 is 200° and the closing timing of the intake valve 31 is suction bottom dead center (0° ABDC).

In this regard, in a cylinder 15 of the group of suspended cylinders of the internal combustion engine 1, if, for example, the engine load is low, the burning of the air-fuel mixture is stopped. Therefore, at a cylinder 15 of the group of suspended cylinders of the internal combustion engine 1, unless the engine load is high to a certain extent and the operating state is close to the maximum output power point, the air-fuel mixture is not burned. Conversely, at a cylinder 15 of the group of suspended cylinders, compared with a cylinder 15 of the group of operating cylinders, it can be said that the air-fuel mixture is burned only at an operating state close to the maximum output power point. Therefore, at a cylinder 15 of the group of suspended cylinders of the internal combustion engine 1, the clearance CR of the wall surface 51 has to be set so that the strength of the disturbance generated in the combustion chamber 16 at the maximum output power point is greater.

As will be understood from FIG. 8A, the strength of the disturbance generated in a combustion chamber 16 at the maximum output power point is maximum when the clearance CR of the wall surface 51 is 2.6 mm or so, regardless of the operating angle or closing timing of the intake valve 31. Therefore, in an internal combustion engine of the above specifications where the engine speed is 5600 rpm and the supercharging pressure is 200 kPa at the maximum output power point, the strength of disturbance becomes maximum when the clearance CR of the wall surface 51 is 2.6 mm or so.

Further, as will be understood from FIG. 8A, it will be understood that the strength of the disturbance generated in a combustion chamber 16 at the maximum output power point is a relatively large value in the range of clearance CR of the wall surface 51 of 1.8 mm to 3.4 mm, regardless of the operating angle or closing timing of the intake valve 31. Therefore, in an internal combustion engine 1 of the above specifications where the engine speed is 5600 rpm and the supercharging pressure is 200 kPa at the maximum output power point, the clearance CR of the wall surface 51 is preferably set to 1.8 mm to 3.4 mm, more preferably is set to 2.2 mm to 3.0 mm, still more preferably is set to 2.4 mm to 2.8 mm.

If changing the perspective, in an internal combustion engine 1 of the above specifications where the engine speed is 5600 rpm and the supercharging pressure is 200 kPa at the maximum output power point, the clearance CR of the wall surface 51 is preferably set to equal to or greater than −0.8 mm from the clearance CRm of the wall surface 51 where the strength of disturbance at the maximum output power point is maximum (that is, 2.6 mm), more preferably is set to equal to or greater than −0.4 mm therefrom, further preferably is set to equal to or greater than −0.2 mm therefrom. Similarly, in an internal combustion engine 1 of the above specifications where the engine speed is 5600 rpm and the supercharging pressure is 200 kPa at the maximum output power point, the clearance CR of the wall surface 51 is preferably set to equal to or less than +0.8 mm from the clearance CRm of the wall surface 51 where the strength of disturbance at the maximum output power point is maximum (that is, 2.6 mm), more preferably is set to equal to or less than +0.4 mm therefrom, further preferably is set to equal to or less than +0.2 mm therefrom.

In this regard, the strength of disturbance u' generated in a combustion chamber 16 in the vicinity of compression top dead center at the maximum output power point can be approximated by the following formula (7) by analysis using the response surface methodology:

$$u' = a\cdot NE + b\cdot IVA + c\cdot LF + d\cdot \varepsilon + e\cdot IVC + f\cdot CR + g\cdot NE\cdot IVA + h\cdot NE\cdot CR + i\cdot Pm\cdot TTR + j\cdot Pm\cdot CR + k\cdot IVA\cdot IVC + l\cdot \varepsilon^2 + m\cdot IVC^2 + n\cdot CR^2 \quad (7)$$

Here, NE indicates the engine rotational speed (rpm), IVA the operating angle of the intake valve 31 (°), LF the maximum lift amount (mm) of the intake valve 31, E the compression ratio, IVC the closing timing of the intake valve (° ABDC), CR the clearance (mm) of the wall surface 51 from the passage surface of the edge part of the intake valve 31, TTR the intake port TTR (tumble ratio), and Pm the pressure (kPa) in the intake passage. Further, "a" to "n" are constants. In particular, h=0.0000788, j=−0.003585, and n=−0.0621023.

Here, if modifying the formula (7), the strength of disturbance u' generated in the combustion chamber 16 can be expressed by the following formula (8):

$$u' = n\left(CR + \frac{h\cdot NE + j\cdot Pm + f}{2n}\right)^2 - n\frac{(h\cdot NE + j\cdot Pm + f)}{2n} + \ldots \quad (8)$$

In the formula (8), "n" is a negative constant, and therefore it will be understood that the strength of disturbance u' generated in the combustion chamber 16 is expressed as a quadratic function projecting upward with respect to the clearance CR. Further, from formula (8), the clearance CRm where the strength of disturbance u' generated in the combustion chamber 16 becomes maximum is expressed by the following formula (9):

$$CRm = -\frac{h\cdot NE + j\cdot Pm + f}{2n} \quad (9)$$

From the above formula (9), it will be understood that the higher the engine rotational speed NE, the greater the clearance CRm at which the strength of disturbance u' at the maximum output power point is maximum. Similarly, from formula (9), it will be understood that the higher the pressure Pm in the intake passage at the maximum output power point, the smaller the clearance CRm at which the strength of disturbance u' at the maximum output power point is maximum.

In the present embodiment, at a cylinder 15 in the group of suspended cylinders, the clearance CR of the wall surface 51 is set to within ±0.8 mm, preferably within ±0.4 mm, more preferably within ±0.2 mm, with respect to the thus calculated clearance CRm of the wall surface 51 where the strength of disturbance at the maximum output power point is maximum (see formulas (1) to (6)). Due to this, in a cylinder 15 in the group of suspended cylinders, the strength of disturbance generated in the combustion chamber 16 at the maximum output power point can be large.

In this regard, in many internal combustion engines provided with superchargers used in commercially sold vehicles, the output power of an internal combustion engine where the engine rotational speed is 5500 to 6200 rpm in range and the pressure in the intake pipe is 200 to 240 kPa in range becomes the maximum. In this range of engine rotational speed and range of pressure in the intake pipe, the clearance CR where the strength of disturbance u' is maximum is about 1.8 mm to about 3.4 mm if calculated by the above formula (9). Therefore, from such a viewpoint as well, in a cylinder 15 of the group of suspended cylinders, the clearance CR of the wall surface 51 is preferably 1.8 mm to 3.4 mm. As explained above, in the present embodiment, in a cylinder 15 of the group of suspended cylinders, the clearance CR of the wall surface 51 is 1.8 mm to 3.4 mm, and therefore the strength of disturbance can be a large in an operating state where the output power of the internal combustion engine is maximum.

On the other hand, in a cylinder 15 of the group of operating cylinders of the internal combustion engine 1, the air-fuel mixture is burned, even if, for example, the engine load is low. In particular, in general, the frequency by which an internal combustion engine 1 is operated in a state of a relatively low engine load is high, and therefore in a cylinder 15 of the group of operating cylinders of the internal combustion engine 1, the frequency by which it is operated by a low engine load is high. Therefore, in a cylinder 15 of the group of operating cylinders of the internal combustion engine 1, the clearance CR of the wall surface 51 has to be set so that the strength of the disturbance generated in the combustion chamber 16 is greater in the operating state with a low engine load, for example, in the operating state of the internal combustion engine 1 with the highest frequency.

As shown in FIG. 8B, in the operating state of the internal combustion engine 1 with the highest frequency, as the clearance CR of the wall surface 51 is grater beyond 1 mm, the strength of the disturbance generated in the combustion chamber 16 is smaller. Therefore, in a cylinder 15 of the group of operating cylinders of the internal combustion engine 1, the clearance CR of the wall surface 51 is preferably small.

In the present embodiment, in a cylinder 15 of the group of operating cylinders of the internal combustion engine 1, the clearance CR of the wall surface 51 is configured so as to be less than Cl calculated by the above formula (1). Alternatively, in the present embodiment, in a cylinder 15 of the group of operating cylinders, the clearance CR of the wall surface 51 is configured to be less than 1.8 mm, preferably equal to or less than 1.4 mm, more preferably equal to or less than 1.0 mm Therefore, in an operating cylinder, the strength of the disturbance generated in the combustion chamber 16 in the operating state of the internal combustion engine 1 with the highest frequency can be large.

The invention claimed is:

1. An internal combustion engine comprising a plurality of cylinders, these cylinders divided into a first group of cylinders where the air-fuel mixture is burned in the entire operating region where output power is necessary and a second group of cylinders where the air-fuel mixture is not burned in part of the operating region in the operating region where output power is necessary, the internal combustion engine comprising:
an intake opening facing a combustion chamber of each cylinder and opened and closed by an intake valve;
an exhaust opening facing a combustion chamber of each cylinder and opened and closed by an exhaust valve; and
a mask part having a wall surface extending along an outer periphery of the intake opening toward the inside of the combustion chamber at an opposite side from the exhaust opening side in the direction extending through the center of an entire of the intake opening and the center of an entire of the exhaust opening,
wherein the mask part is configured so that a clearance from a passage surface of an edge part of the intake valve to the wall surface of the mask part is smaller at each cylinder of the first group of cylinders than each cylinder of the second group of cylinders.

2. The internal combustion engine according to claim 1, wherein the mask part of each cylinder of the first group of cylinders is configured so that the clearance is less than Cl calculated by the following formula (1), and the mask part of each cylinder of the second group of cylinders is configured so that the clearance is equal to or greater than Cl calculated by the following formula (1):

$$Cl=-(h \cdot NEm+j \cdot Pm+f)/2n-0.8 \tag{1}$$

in which formula (1), NEm is a rotational speed (rpm) at an maximum output power point, Pm is an intake pipe pressure (kPa) at the maximum output power point, $h=0.0000788$, $j=-0.003585$, $f=0.6531914$, and $n=-0.0621023$.

3. The internal combustion engine according to claim 2, wherein the mask part of each cylinder of the second group of cylinders is configured so that the clearance is equal to or less than Ch calculated by the following formula (2):

$$Ch=-(h \cdot NEm+j \cdot Pm+f)/2n+0.8 \tag{2}$$

4. The internal combustion engine according to claim 1, wherein the mask part of each cylinder of the first group of cylinders is configured so that the clearance is less than 1.8 mm and the mask part of each cylinder of the second group of cylinders is configured so that the clearance is equal to or greater than 1.8 mm.

5. The internal combustion engine according to claim 2, wherein the mask part of each cylinder of the second group of cylinders is configured so that the clearance is equal to or less than 3.4 mm.

6. The internal combustion engine according to claim 1, further comprising a cylinder head in which the intake opening, the exhaust opening, and the mask part are formed, wherein the edge part of the wall surface the most at the lift direction side of the intake valve is positioned on a surface of the cylinder head abutting against a cylinder block.

7. The internal combustion engine according to claim 1, wherein the wall surface is formed so that the clearance from the passage surface of the edge part of the intake valve becomes constant in the circumferential direction at different positions in the lift direction of the intake valve.

* * * * *